No. 812,216. PATENTED FEB. 13, 1906.
G. W. LORIMER.
POWER CONTROLLING LEVER.
APPLICATION FILED JUNE 14, 1902.
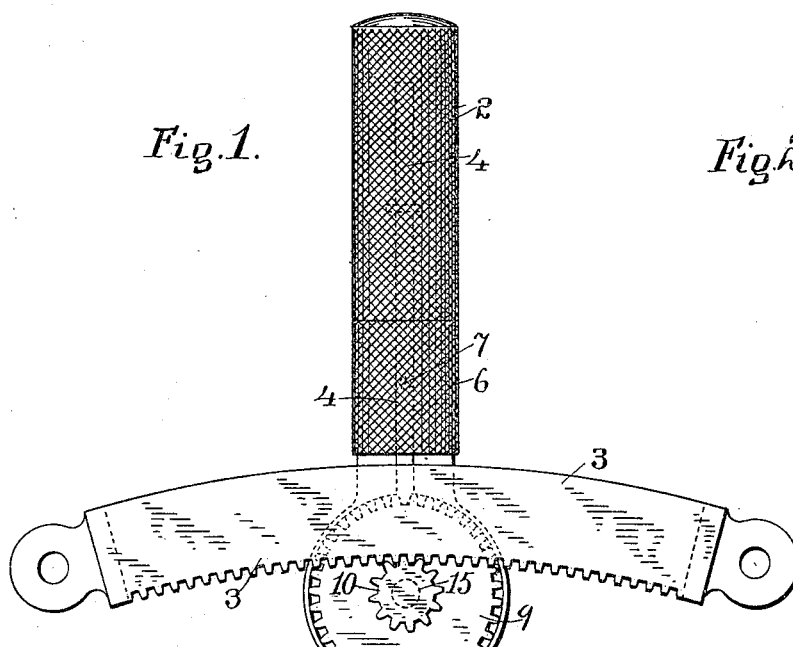
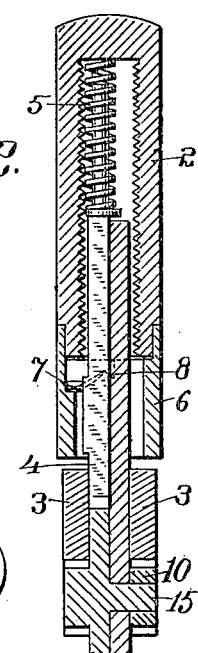
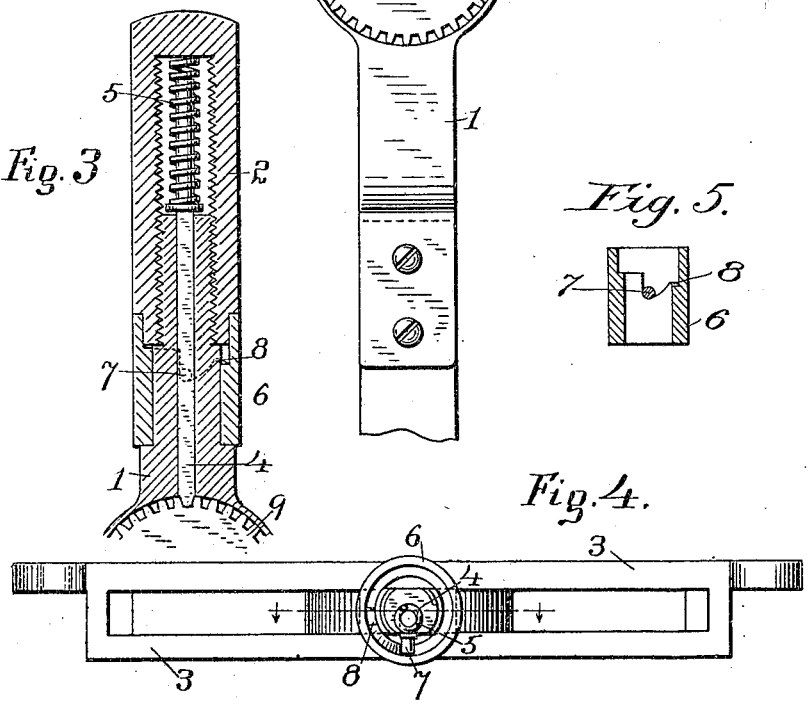
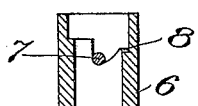
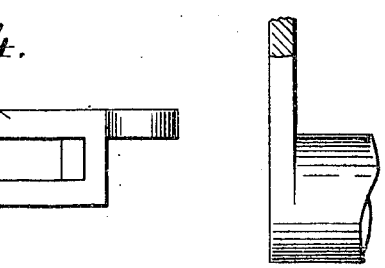
Witnesses:
Otto Greenberg
E. L. Lawler
Inventor
George W. Lorimer
By H. C. Townsend
Attorney

UNITED STATES PATENT OFFICE.

GEORGE WILLIAM LORIMER, OF PIQUA, OHIO.

POWER-CONTROLLING LEVER.

No. 812,216.　　　Specification of Letters Patent.　　　Patented Feb. 13, 1906.

Application filed June 14, 1902. Serial No. 111,625.

*To all whom it may concern:*

Be it known that I, GEORGE WILLIAM LORIMER, a citizen of the British Empire, and a resident of Piqua, in the county of Miami and State of Ohio, have invented certain new and useful Improvements in Power-Controlling Levers, of which the following is a specification.

My invention relates to power-controlling levers designed for manual operation and operatively connected with the throttle-valve of a steam-engine or with other means whereby the power of a steam or other motor may be controlled. In devices of this character it is desirable ordinarily to provide some means whereby the lever may be locked or held fixed in any one of its different adjusted positions, and for this purpose it has heretofore been proposed to employ a locking dog or bolt mounted upon the lever in position to be under control of the operator and adapted to engage directly with a fixed rack in suitable proximity to such lever, as well understood in the art. In this device the nicety of adjustment is limited to a degree which makes such mechanism not wholly suited for use upon automobiles driven by steam-engines, because it does not give the desired fineness of regulation, the number of adjusted positions being practically limited by the length of the rack and the number of notches which can be located therein in the arc of adjustment of the lever itself.

My invention relates to certain details of construction in a locking device organized to give a finer regulation and a multiplied movement by attaching to the lever a suitable pinion or gear-wheel which is itself connected with the notched locking plate or disk and gears with a fixed segment or rack, said pinion and said locking-plate being of such proportion or relation or so connected by intermediate devices that the movement given to the notched edge of the locking-plate will be greater than the movement of translation of the parts mounted upon the lever in moving through any given arc of adjustment.

Another part of my invention relates to the means whereby the locking bolt or dog may be held out of locking position temporarily or may be left in position to lock the lever, and to this end the invention consists in providing upon the actuating-lever a suitable thimble or sleeve having interior concealed parts which are operatively connected with the bolt and are of such nature that by rotating the thimble or sleeve the position of the bolt with relation to the notched edge of the locking-plate may be controlled. Preferably, also, and in order to prevent meddling or interference by the curious the said locking thimble or sleeve is made as a section of the handle for the control-lever and practically forms a continuation thereof, so that when the line of union is nicely fitted it will not be recognized as a separate part independent of the handle itself.

My invention consists also in the details of construction and the improved combinations of parts, as hereinafter more particularly described and then specified in the claims.

In the accompanying drawings, Figure 1 is a side elevation of a device embodying my invention. Fig. 2 is a vertical central section through the same, taken at right angles to the plane in which the operating-lever swings. Fig. 3 is a vertical central section of the handle and interior parts, taken on the line at right angles to the section shown in Fig. 2. Fig. 4 is a plan of the device, the handle proper being removed to show the parts within the thimble or sleeve which controls the position of the bolt or dog. Fig. 5 shows the thimble in vertical section detached.

1 indicates the controlling-lever by whose adjustment the power of any motor is controlled, and 2 the handle of said lever, preferably made cylindrical in outline and properly roughened to form a good grip.

The handle 2 is preferably made hollow, as shown in sectional view, and is connected by a screw-coupling, as shown, with the lever 1 itself. In the upper end of the lever and working longitudinally thereof in suitable guideways is the locking bolt or dog 4, whose upper end extends into the hollow handle and is there acted upon by a suitable spring 5, located between the end of the handle and a shoulder or pin upon the dog or bolt, as shown. This spring acts to normally seat the end of the dog in the notches in the locking-plate 9. The locking-plate is preferably made so as to be capable of rotation in suitable bearings on the lever 1 itself and has, preferably, its whole edge notched, although if made of sufficient size it might have only a portion of its edge notched.

For the purpose of giving a multiplied movement to the notched edge of the locking-plate 9 the said plate is provided with a pinion 10, secured to a spindle or shaft projecting from said plate through the lever 1 and gearing with a fixed rack suitably mounted. By preference this rack is formed upon the guide 3 for the lever 1 and upon the under side of said guide, so as to be out of the way. When the lever is swung, there will be, as obvious, a multiplied movement given to the periphery of the notched plate 9, thus affording a larger number of locking-points in the swing of the lever through a given arc than could be afforded by any fixed notched plate—such as, for instance, a notched guide 3, directly engaged by the dog, as has been the previous practice.

Operatively connected with the bolt for the purpose of raising it or keeping it raised out of the notches in plate 9 is a thimble or sleeve 6, mounted to turn upon the lever 1 and in such position as to be readily operated by the thumb or finger of the hand grasping the handle 2. The sleeve 6 forms, as shown, practically a section of the handle 2, and the joint between said section and the handle proper is a flush joint, so that the part 6 will not be distinguishable as a separate or distinct part from the handle proper, and will therefore afford a means for concealed locking of the lever when said thimble is turned to the proper extent to permit the spring 5 to seat the dog or bolt in a notch of the disk or plate 9.

The sleeve is operatively connected upon its interior with the bolt by any suitable means—as, for instance, by means of a camway formed in a countersunk portion of said thimble and a pin 7 projecting from the bolt and resting on said camway. The straight portion of the cam where the pin will be at rest and the bolt raised to free the lever is indicated at 8, Fig. 3. By rotating the thimble the pin is permitted to ride down the incline to position where the bolt will be engaged with a notch in the plate 9 and the lever securely locked. A reverse movement of the thimble will raise the dog or bolt and permit the lever to be adjusted to a new position. When the lever is to be left locked, the thimble is turned to position to permit the spring to seat the dog in a notch of the plate. For the purpose of giving a free throttle control the spindle may be turned and left in position where the pin will rest at the point 8, in which case the lever may be manipulated in the same manner as those power-controlling levers which have no attached locking devices.

It will be ovious that my invention may be carried out in other forms of devices adapted to secure a multiplied movement of the locking-plate, as hereinbefore set forth, and that other means may be employed for giving the manipulated movement. It will also be obvious that in other details my invention is capable of modification without departing from the essential features hereinafter claimed.

My invention is especially useful for the power-controlling levers of steam-vehicles, which as ordinarily constructed require a fine regulation of the throttle, but is not limited to such use, as it may be employed in connection with the power-controlling lever of any motor and with any power-controlling device in place of the throttle.

By providing a bolt-operating thimble or similar device with operative connecting means adapted to retain either of the positions suitable for locking or unlocking the lever it will be obvious that the said lever may be used in the ordinary manner with free control without requiring the operator to hold the adjusting device of the bolt in any particular position, as is necessary with devices of this nature in which a supplemental lever is mounted upon the main controlling-lever and is connected with a bolt in a manner to hold the same out of position for locking the lever so long as said supplemental lever is held by the hand in a certain position against the power of a spring.

What I claim as my invention is—

1. The combination with a power-controlling lever and its actuating-handle, of a locking dog or bolt mounted thereon, and an actuating thimble or collar forming a section of the actuating-handle, and means concealed within the handle for operatively connecting the thimble with the bolt or dog.

2. The combination with a power-controlling lever, of a hollow actuating-handle secured thereto, a locking-plate, a locking-dog concealed in the handle, and a rotary thimble or collar mounted on said lever and connected with the dog for causing the same to engage and disengage the plate.

3. The combination with a power-controlling lever, of a locking-dog mounted thereon, a locking-plate engaged by and a rotary thimble or collar mounted on the lever and having a cam for holding the dog out of locking position or permitting it to hold the lever locked, at will.

4. The combination with a power-controlling lever, of a locking-bolt working in a longitudinal guide in said lever, an actuating thimble or collar mounted on the lever and connecting with the bolt, a rotatable locking-plate mounted on the lever, a pinion secured to said plate and a fixed rack as and for the purpose described.

5. The combination with a power-controlling lever, of a locking-bolt, a hollow handle concealing said bolt, an actuating-thimble forming a part of said handle, a locking-plate mounted on the lever, a fixed rack, an intermediate means between the rack and the locking-plate for rotating the same.

6. The combination with a power-controlling lever, of a locking bolt or dog carried thereby, an operating thimble or sleeve provided with a cam operatively connected with said bolt or dog and a locking-plate adapted to be engaged by said bolt or dog.

Signed at Piqua, in the county of Miami and State of Ohio, this 24th day of May, A. D. 1902.

GEORGE WILLIAM LORIMER.

Witnesses:
C. B. JAMISON,
JAS. WARD KEYS.